US007156440B2

(12) United States Patent
Katagiri

(10) Patent No.: US 7,156,440 B2
(45) Date of Patent: Jan. 2, 2007

(54) GLOVE COMPARTMENT

(75) Inventor: Katsuhiro Katagiri, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/434,075

(22) Filed: May 16, 2006

(65) Prior Publication Data

US 2006/0267364 A1 Nov. 30, 2006

(30) Foreign Application Priority Data

May 24, 2005 (JP) ............................ 2005-151469

(51) Int. Cl.
*B60R 7/06* (2006.01)

(52) U.S. Cl. .................................. 296/37.12; 296/37.8

(58) Field of Classification Search ............... 296/37.1, 296/37.8, 37.12; 292/34, 35, 36, 37, 41
See application file for complete search history.

(56) References Cited

U.S. PATENT DOCUMENTS 6,669,243 B1 * 12/2003 Katoh et al. ............... 296/37.8
2004/0189012 A1 * 9/2004 Katou et al. .................. 292/34
2005/0104380 A1 * 5/2005 Cho ............................ 292/33
2006/0055196 A1 * 3/2006 Yamada ................... 296/37.12

FOREIGN PATENT DOCUMENTS

JP A-11-091448 6/1999
JP A-2004-210260 7/2004

* cited by examiner

*Primary Examiner*—Jason Morrow
(74) *Attorney, Agent, or Firm*—Posz Law Group, PLC

(57) ABSTRACT

A glove compartment is provided in an instrument panel of a vehicle. A lid selectively opens and closes an opening formed in the instrument panel. A gap is defined between side edges of the lid and side edges of the opening when the lid closes the opening. Gap adjusters hold the side edges of the lid with respect to the side edges of the opening when the lid closes the opening, thereby adjusting the gaps. A locking mechanism locks the lid in a state closing the opening. An unlocking mechanism cancels the locked state of the lid. The unlocking mechanism includes an extrusion pin that is configured to push the lid to the outside of the opening when canceling the locked state of the lid.

13 Claims, 3 Drawing Sheets

GLOVE COMPARTMENT

BACKGROUND OF THE INVENTION

The present invention relates to a glove compartment located in an instrument panel of a vehicle.

As shown in FIGS. 3A and 3B, an instrument panel 110 of a vehicle has an accommodation space 112 for accommodating a glove compartment 111. A rectangular opening 112*a* of the accommodation space 112 is formed in a side of the accommodation space 112 close to an occupant (on the rear side with respect to the longitudinal direction of the vehicle). A lid 113 of the glove compartment 111 (see FIG. 3B) is pivotally supported at the sides of the lower portion of the opening 112*a*.

Engagement steps 117 are formed at the both sides of the opening 112*a*, and lid steps 116 are formed at the both sides of the lid 113 of the glove compartment 111. The engagement steps 117 of the opening 112*a* and the lid steps 116 can be engaged with each other. When the lid 113 of the glove compartment 111 closes the opening 112*a*, the engagement steps 117 contact the lid steps 116. This prevents the lid 113 from intruding into the accommodation space 112 by an excessive degree. Therefore, the ornamental surface of the lid 113 is substantially flush with the ornamental surface of the instrument panel 10 about the opening portion 112*a*. As a result, the appearance of the instrument panel 110 about the glove compartment 111 is improved.

A gap adjuster 118 is located substantially in a vertical center of each engagement step 117. The gap adjusters 118 hold the lid 113 at a predetermined position, thereby adjusting the gap d (see FIG. 3B) between the corresponding side edge of the lid 113 and the edge of the opening portion 112*a*. Each gap adjuster 118 has a guide surface 118*a* on which the side edge of the corresponding lid step 116 slides, and smoothly guides the lid step 116 until it contacts the lid engagement step 117. When the glove compartment 111 is closed with the lid 113, the left and right gap adjusters 118 hold the lid 113 of the glove compartment 111 in between, and maintains the gap d between each side edge of the lid 113 and the edge of the opening 112*a*. This further improves the appearance of the instrument panel 110 surrounding the glove compartment 111, and prevents the glove compartment 111 from chattering due to vehicle vibrations.

However, in the prior art glove compartment 111, the lid 113 can be ill-fitted due to warping. Also, when the temperature in the passenger compartment is high, the lid 113 is thermally expanded, which can result in thermal deformation. Accordingly, the holding force between the sides of the lid 113 and the gap adjusters 118 can be excessively increased. In such a case, the lid 113, which is held by the gap adjusters 118 located on the left and right sides of the lid 113, does not open by its own weight.

SUMMARY OF THE INVENTION

Accordingly, it is an objective of the present invention to provide a glove compartment that permits a lid to always properly respond to opening operation, while improving the ornamentality of an instrument panel.

To achieve the above objective, one aspect of the present invention provides a glove compartment provided in an instrument panel of a vehicle, including a lid, a gap adjuster, and a locking mechanism, and an unlocking mechanism. The lid selectively opens and closes an opening formed in the instrument panel. A gap is defined between an edge of the lid and an edge of the opening when the lid closes the opening. The gap adjuster holds the edge of the lid with respect to the edge of the opening when the lid closes the opening, thereby adjusting the gap. The locking mechanism locks the lid in a state closing the opening. The unlocking mechanism cancels the locked state of the lid, and includes an extrusion pin. The extrusion pin is configured to push the lid to the outside of the opening when canceling the locked state of the lid.

Another aspect of the present invention provides a glove compartment provided in an instrument panel of a vehicle, including a lid, a gap adjuster, a locking mechanism, and an unlocking mechanism. The lid selectively opens and closes an opening formed in the instrument panel. A gap is defined between an edge of the lid and an edge of the opening when the lid closes the opening. The gap adjuster holds the edge of the lid with respect to the edge of the opening when the lid closes the opening, thereby adjusting the gap. The locking mechanism locks the lid in a state closing the opening. The locking mechanism includes an engaging member provided on a back of the lid to be movable in a direction intersecting the opening-closing direction of the lid, and an engaging hole formed in the edge of the opening. The engaging member is engageable with the engaging hole. The unlocking mechanism cancels the locked state of the lid. The unlocking mechanism includes an operation button provided in the edge of the opening, and an extrusion pin. The extrusion pin is moved in a direction intersecting the opening-closing direction of the lid by the operation button. In accordance with manipulation of the operation button, the extrusion pin projects into the opening through the engaging hole, thereby pushing the engaging member out of the engaging hole, and slides on the lid to apply to the lid a force directed to the outside of the opening.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A glove compartment 11 according to one embodiment of the present embodiment will now be described with reference to the drawings. Hereafter, the advancing direction of the vehicle is referred to as a forward direction.

Figure 1A:
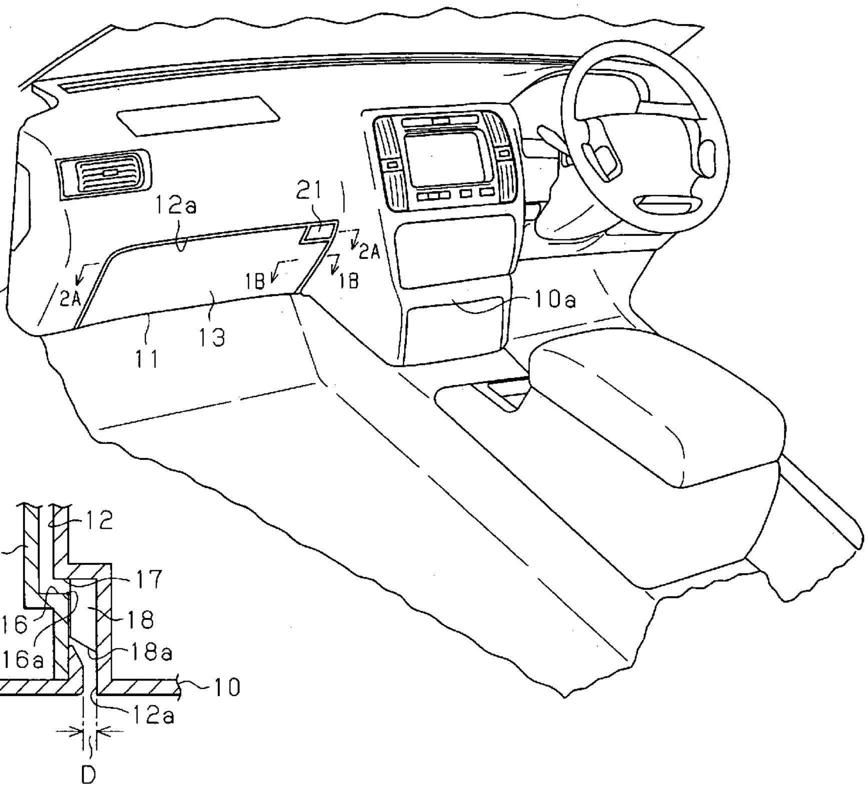
FIG. 1A is a perspective view illustrating a passenger compartment in which a glove compartment according to one embodiment is provided.
Figure 1B:
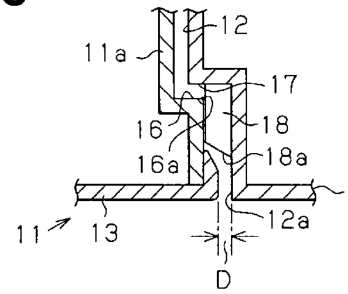
FIG. 1B is a cross-sectional view taken along line 1B—1B of FIG. 1A.

As shown in FIGS. 1A and 1B, an instrument panel 10 of a vehicle has an accommodation space 12 (see FIG. 1B) for accommodating the glove compartment 11. A rectangular opening 12*a* is formed in a rear end of the accommodation space 12. A lid 13 of the glove compartment 11 is pivotally supported at the sides of the lower portion of the opening 12*a*.

Engagement steps 17 are formed on both side edges of the opening 12*a*, and lid steps 16 are formed on both side edges of the lid 13. The engagement steps 17 of the opening 12*a* and the lid steps 16 are engageable with each other. A gap adjuster 18 is located substantially in a vertical center of each engagement step 17. The gap adjusters 18 hold the lid 13 at a predetermined position, thereby adjusting the gap D between the side edge of the lid 13 and the side edge of the opening 12*a*. In this embodiment, the gap D is se to be 1 to 2 mm, and the width of each gap adjuster 18 along the lateral direction of the vehicle is set to be 2 to 5 mm. Each gap adjuster 18 has a guide surface 18*a* on which the side edge 16*a* of the corresponding lid step 16 slides, and smoothly guides the side surface of the lid step 16 until the side surface contacts the side surface of the engagement step 17.

The glove compartment 11 is provided in the instrument panel 10 on the side of the passenger seat in this embodiment. The glove compartment 11 has an operation button 21 in an upper corner of the opening 12*a* that is close to a center panel 10*a* of the instrument panel 10. The location of the button 21 permits occupants on the driver's seat and the front passenger seat to easily manipulate the button 21. According to the glove compartment 11 of this embodiment, a box main body 11*a* accommodated in the accommodation space 12 is integrated with the lid 13.

Figure 2A:
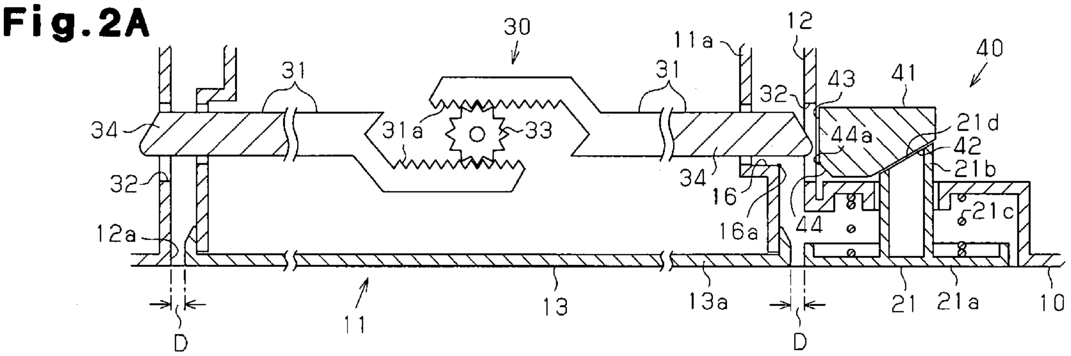
FIG. 2A is a cross-sectional view taken along line 2A—2A of FIG. 1A, showing a state in which the opening is closed by a lid.

As shown in FIG. 2A, the glove compartment 11 includes a locking mechanism 30 and an unlocking mechanism 40. The locking mechanism 30 locks the lid 13 in a state closing the opening 12*a*, while the unlocking mechanism 40 cancels the locked state of the lid 13.

The locking mechanism 30 includes a pair of left and right engaging members 31 and a pair of engaging holes 32. The engaging members 31 are located on the back of the lid 13. The engaging holes 32 are formed in the side walls of the opening 12*a* to receive the distal ends of the engaging members 31. Each engaging member 31 is provided on the back of an ornamental plate 13*a*, which is part of the ornamental surface of the instrument panel 10, such that the engaging member 31 is movable along the ornamental plate 13*a* in the lateral direction of the vehicle. As schematically shown in FIG. 2A, a rack 31*a* is formed on a proximal portion of each engaging member 31. The racks 31*a* of the engaging members 31 are arranged to face each other with a pinion 33 in between. Each engaging member 31 has an engaging portion 34 at the distal end. The engaging portions 34 extend parallel to the ornamental plate 13*a*. The engaging portion 34 of each engaging member 31 is selectively inserted into the corresponding engaging hole 32.

The unlocking mechanism 40 includes the operation button 21 and an extrusion pin 41. The extrusion pin 41 is moved in a predetermined direction in accordance with the manipulation of the operation button 21.

The operation button 21 includes an ornamental plate 21*a* and a rod portion 21*b*. The ornamental plate 21*a* is arranged to be flush with the ornamental surface of the instrument panel 10. The rod portion 21*b* extends forward from the center of the back of the ornamental plate 21*a* so that the rod portion 21*b* and the plate 21*a* form a T-shape. An urging member, which is a coil spring 21*c* in this embodiment, is provided about the rod portion 21*b* to urge the operation button 21 rearward. A first inclined surface 21*d* is formed at the front end of the rod portion 21*b*. The first inclined surface 21*d* is inclined to be located further forward in the vehicle as it approaches the center panel 10*a*.

The extrusion pin 41, which moves along the lateral direction of the vehicle, is located in front of the rod portion 21*b*. A second inclined surface 42 is formed at one end (proximal end) of the extrusion pin 41. The second inclined surface 42 faces the first inclined surface 21*d*. The second inclined surface 42 is inclined to be located further forward in the vehicle as it approaches the center panel 10*a*, and is slidable on the first inclined surface 21*d*. A flat extrusion surface 43 is formed at the other end (distal end) of the extrusion pin 41. The extrusion surface 43 extends perpendicular to the moving direction of the extrusion pin 41. The extrusion surface 43 is located on a side of the engaging portion 34 of one of the engaging members 31, and selectively contacts the engaging portion 34.

Further, a slide surface 44 is formed in the distal end of the extrusion pin 41. The slide surface 44 extends slantly rearward from the rear end of the extrusion surface 43. At the rear portion of the extrusion pin 41, the slide surface 44 is inclined to be located further rearward in the vehicle as it approaches the center panel 10*a*. In other words, the slide surface 44 is inclined to be located further inward of the opening 12*a* as it approaches the advancing end of the pushing direction of the extrusion pin 41. A front end 44*a* (the boundary between the slide surface 44 and the extrusion surface 43) of the slide surface 44 is located frontward of the side edge 16*a* of the corresponding lid step 16, and the rear end of the slide surface 44 is located rearward of side edge 16*a* of the corresponding lid step 16.

An operation of the glove compartment 11 will now be described.

When the opening 12*a* is closed by the lid 13 as shown in FIGS. 1A and 1B, the engagement steps 17 at the sides of the opening 12*a* contact the lid steps 16 located at the sides of the lid 13. This prevents the lid 13 from excessively entering into the accommodation space 12. Therefore, the ornamental surface of the lid 13 is substantially flush with the ornamental surface of the instrument panel 10 about the opening portion 12*a*. This improves the appearance of the instrument panel 10 about the glove compartment 11.

Further, the gap adjusters 18 located at the side edges of the opening 12*a* hold the lid 13 at predetermined positions on the side edges, thereby maintaining the gap D between the each side edge of the lid 13 and the corresponding side edge of the opening 12*a*. This further improves the appearance of the instrument panel 10 surrounding the glove compartment 11, and prevents the glove compartment 11 from chattering due to vehicle vibrations.

At this time, the engaging portions 34 protruding in the opposing lateral directions are inserted into the engaging holes 32 formed in the opening 12*a* as shown in FIG. 2A, so that the lid 13 of the glove compartment 11 is locked in a state closing the opening 12*a*. That is, the locking mechanism 30 formed of the left and right engaging portions 34 and the engaging holes 32 locks the lid 13 of the glove compartment 11 in a state closing the opening 12*a*.

Figure 2B:
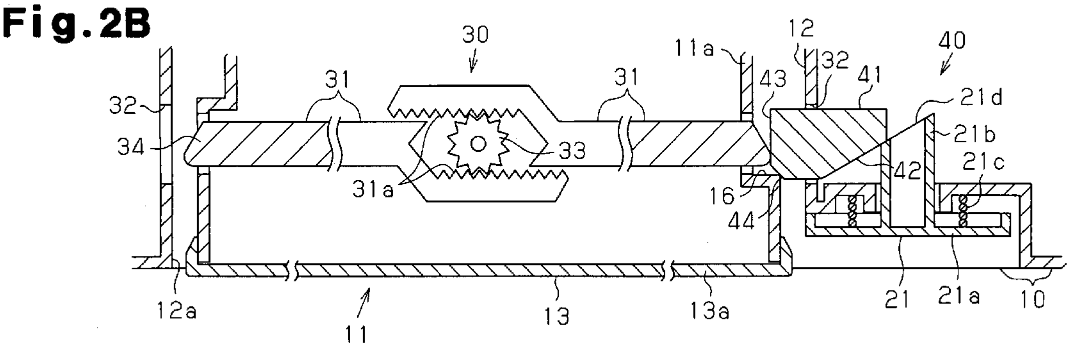
FIG. 2B is a cross-sectional view illustrating the glove compartment, showing a state in which the lid is opened.
Figure 3A:
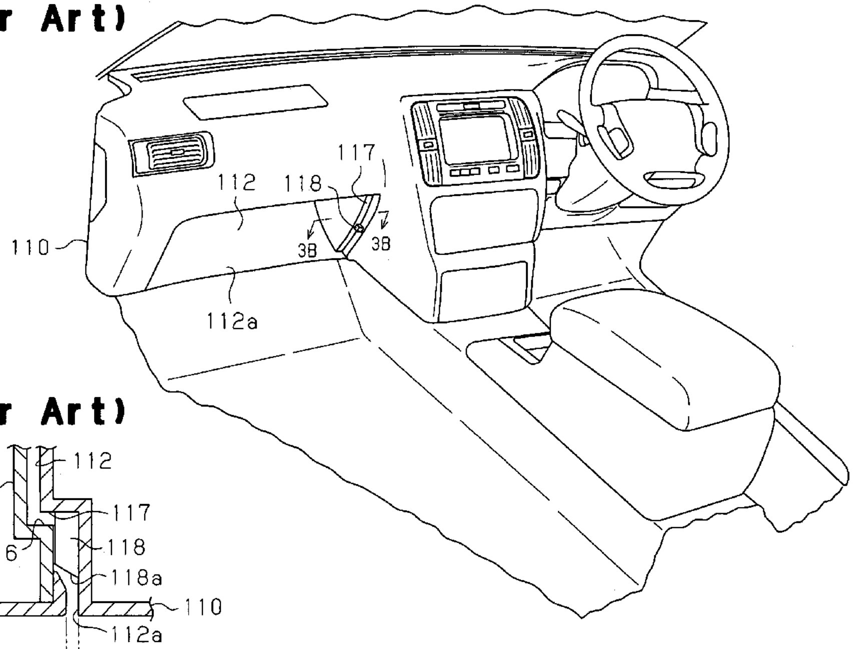
Fig.3A(Prior Art)
FIG. 3A is a perspective view illustrating a prior art glove compartment, from which a lid is omitted.
Figure 3B:
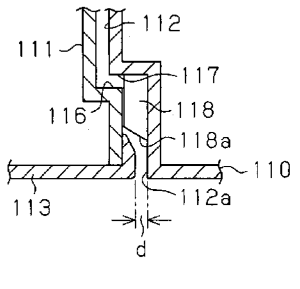
Fig.3B(Prior Art)
FIG. 3B is a cross-sectional view taken along line 3B—3B of FIG. 3A.

When canceling the locked state of the lid 13 to open the opening 12*a*, the operation button 21 is pressed frontward. Then, as shown in FIG. 2B, the rod portion 21*b* moves the extrusion pin 41 in the lateral direction of the vehicle toward the pinion 33, while causing the first inclined surface 21*d* of the operation button 21 and the second inclined surface 42 of the extrusion pin 41 to slide on each other.

Accordingly, the extrusion surface 43 of the extrusion pin 41 pushes the distal end of the engaging portion 34 of one of the engaging members 31 toward the pinion 33. The extrusion surface 43 ultimately pushes the engaging portion 34 of the engaging member 31 out of the engaging hole 32 into the accommodation space 12, that is, from the interior to the exterior of the engaging hole 32. At this time, the engaging portion 34 of the other engaging member 31 is moved in the opposite direction by means of the pinion 33. The engaging portion 34 is then removed from the corresponding engaging hole 32 into the interior of the accommodation space 12. As a result, the engaged state of the left and right engaging members 31 and engaging holes 32, which form the locking mechanism 30, is cancelled. This allows the lid 13 closing the opening 12*a* to be opened.

Further, the slide surface 44 at the distal end of the extrusion pin 41 slides on a peripheral portion of the lid 13, specifically, on the side edge 16*a* of one of the lid steps 16, as the extrusion pin 41 moves. At this time, the slide surface 44 pushes the peripheral portion of the lid 13 rearward (toward the outside the opening 12*a*). While pushing the lid 13 rearward, the slide surface 44 reliably cancels the holding state between the sides of the lid 13 and the gap adjusters 18 (see FIG. 1B). After the holding state is cancelled, the lid 13 pivots rearward by the own weight and opens the opening 12*a*.

The above embodiment has the advantages described below.

The glove compartment 11 of the above embodiment has the gap adjusters 18, which adjust the gap D between each side edge of the lid 13 and the corresponding side edge of the opening 12*a*, thereby holding the lid 13 at a predetermined position with respect to the opening 12*a*. Therefore, when the lid 13 of the glove compartment 11 closes the opening 12*a*, the lid 13 is located at an appropriate position in relation to the instrument panel 10. This improves the ornamentality of the instrument panel 10.

Further, the glove compartment 11 has the unlocking mechanism 40, which includes the extrusion pin 41. The extrusion pin 41 is manipulated when canceling the locked state of the lid 13. When the locked state of the lid 13 caused by the locking mechanism 30 is cancelled, the extrusion pin 41 pushes the lid 13 outward of the opening 12*a*. As a result, even if the holding force between the lid 13 and the gap adjusters 18 is great, the lid 13 is opened at an appropriate timing after the manipulation for opening the lid 13. Therefore, the glove compartment 11 permits the lid 13 to operate in response to the opening manipulation, while improving the ornamentality of the instrument panel 10.

The glove compartment 11 of the above embodiment includes the locking mechanism 30, which is known as a bolt lock. In such a locking mechanism 30, when the engaging portions 34 move along the back of the lid 13, the engaging portions 34 are inserted into and removed from the engaging holes 32. Accordingly, the lid 13 is locked and unlocked with respect to the opening 12*a*. When shifting from the locked state to the unlocked state, the operation button 21 is manipulated to cause the distal end of the extrusion pin 41 to protrude from the interior of the engaging holes 32 to the outside of the hole 32. At this time, the distal end of the extrusion pin 41 presses the engaging portion 34 in the engaging holes 32, thereby pushing the engaging portion 34 out of engaging holes 32. As a result, the locked state is cancelled.

At this time, the distal end of the extrusion pin 41 moves along the back of the lid 13 while pushing one of the engaging portions 34. In this case, the distal end of the extrusion pin 41 contacts a side edge of the lid 13 at the slide surface 44, and pushes the side edge of the lid 13 toward the outside of the opening 12*a* by means of the slide surface 44. As a result, regardless of the magnitude of the holding force between the lid 13 and the gap adjusters 18, the lid 13 is opened at an appropriate timing after the manipulation for opening the lid 13.

Particularly, since the slide surface 44 is inclined relative to the moving direction of the extrusion pin 41, the sliding distance between the slide surface 44 and the side edge of the lid 13 is longer than the moving distance of the extrusion pin 41. Therefore, when the extrusion pin 41 is moved by adding a small force, a large pushing force is applied to the lid 13. Thus, even if a great holding force acts between the lid 13 and the gap adjusters 18, the lid 13 is easily opened against such holding force.

The preferred embodiment may be modified as described below.

The side edge 16*a* of the lid step 16 may be tapered to correspond to the slide surface 44. Alternatively, the entire lid step 16 may be tapered to correspond to the slide surface 44.

In the illustrated embodiment, the lid steps 16 are located rearward of the engaging portions 34. However, the lid steps 16 may be above or below the engaging portions 34. If the lid steps 16 are located above or below the engaging portions 34, the slide surface 44 needs to be located above or below the extrusion pin 41, and needs to be slidable on the side edge 16*a* of the corresponding lid step 16.

The slide surface 44 may have an arcuate cross-section with a bulging center portion, or with a concaved center portion.

The operation button 21 may be omitted, so that the extrusion pin 41 is directly pushed by a finger in the lateral direction of the vehicle.

The box main body 11*a* of the glove compartment 11 may be omitted. The glove compartment 11 according to this modification includes an accommodation space 12 that opens in the instrument panel 10, and a lid 13 that closes the opening 12*a* of the accommodation space 12.

Therefore, the present examples and embodiments are to be considered as illustrative and not restrictive and the invention is not to be limited to the details given herein, but may be modified within the scope and equivalence of the appended claims.

The invention claimed is:

1. A glove compartment provided in an instrument panel of a vehicle, comprising:

a lid that selectively opens and closes an opening formed in the instrument panel, a gap being defined between an edge of the lid and an edge of the opening when the lid closes the opening;

a gap adjuster that holds the edge of the lid with respect to the edge of the opening when the lid closes the opening, thereby adjusting the gap;

a locking mechanism that locks the lid in a state closing the opening; and an unlocking mechanism for canceling the locked state of the lid, the unlocking mechanism including an extrusion pin, the extrusion pin being configured to push the lid to the outside of the opening when canceling the locked state of the lid.

2. The glove compartment according to claim 1, wherein the locking mechanism including an engaging member provided on a back of the lid to be movable in a direction intersecting the opening-closing direction of the lid, and an engaging hole formed in the edge of the opening, the engaging member being engageable with the engaging hole, and wherein the unlocking mechanism includes an operation button provided in the edge of the opening, and wherein, in accordance with manipulation of the operation button, the extrusion pin projects into the opening through the engaging hole, thereby pushing the engaging member out of the engaging hole.

3. The glove compartment according to claim 2, wherein the extrusion pin has a slide surface engageable with the lid, and wherein, when the extrusion pin moves in a pushing direction to protrude into the opening, the slide surface slides on the lid to apply to the lid a force directed to the outside of the opening.

4. The glove compartment according to claim 3, wherein the slide surface is inclined relative to the moving direction of the extrusion pin.

5. The glove compartment according to claim 3, wherein the slide surface is inclined to be located further inward of the opening as it approaches an advancing end in the pushing direction of the extrusion pin.

6. The glove compartment according to claim 3, wherein, in a portion facing the extrusion pin, the lid has a step that is engageable with the extrusion pin.

7. The glove compartment according to claim 6, wherein a portion of the lid that is located outward from the step in the opening is offset in a direction opposite the pushing direction of the extrusion pin with respect to a portion of the lid that is located inward from the step in the opening.

8. The glove compartment according to claim 1, wherein the lid is configured to pivot with respect to the opening about a lower end portion of the lid, and wherein the locking mechanism is located in an upper end portion of the glove compartment.

9. The glove compartment according to claim 2, wherein the operation button is located in a portion of the edge of the opening that is close to a center of a passenger compartment.

10. The glove compartment according to claim 2, wherein the operation button is urged to the outside of the opening by an urging member.

11. The glove compartment according to claim 2, wherein the operation button is arranged to be flush with the instrument panel.

12. A glove compartment provided in an instrument panel of a vehicle, comprising:

a lid that selectively opens and closes an opening formed in the instrument panel, a gap being defined between an edge of the lid and an edge of the opening when the lid closes the opening;

a gap adjuster that holds the edge of the lid with respect to the edge of the opening when the lid closes the opening, thereby adjusting the gap;

a locking mechanism that locks the lid in a state closing the opening, the locking mechanism including an engaging member provided on a back of the lid to be movable in a direction intersecting the opening-closing direction of the lid, and an engaging hole formed in the edge of the opening, the engaging member being engageable with the engaging hole;

unlocking mechanism for canceling the locked state of the lid, the unlocking mechanism including an operation button provided in the edge of the opening, and an extrusion pin being moved in a direction intersecting the opening-closing direction of the lid by the operation button, wherein, in accordance with manipulation of the operation button, the extrusion pin projects into the opening through the engaging hole, thereby pushing the engaging member out of the engaging hole, and slides on the lid to apply to the lid a force directed to the outside of the opening.

13. The glove compartment according to claim 12, wherein the extrusion pin has a slide surface that is inclined relative to the moving direction of the extrusion pin and is engageable with the lid, and, wherein the slide surface is inclined to be located further inward of the opening as it approaches an advancing end in the pushing direction of the extrusion pin.

* * * * *